United States Patent

Brayton et al.

[15] 3,705,409

[45] Dec. 5, 1972

[54] TABLEAU NETWORK DESIGN SYSTEM

[72] Inventors: Robert K. Brayton, Briarcliff Manor; Fred G. Gustavson; Gary D. Aachtel, both of Ossining, all of N.Y.

[73] Assignee: International Business Machines Corporation, Armonk, N.Y.

[22] Filed: Dec. 9, 1970

[21] Appl. No.: 96,496

[52] U.S. Cl...................444/1, 235/150.1, 340/172.5

[51] Int. Cl...............................................G06f 15/32

[58] Field of Search........235/150, 150.1, 151, 151.1, 235/151.3, 151.31; 340/172.5; 444/1

[56] References Cited

OTHER PUBLICATIONS

Tinney et al., "Direct Solution of Sparse Network Equations By Optimally Ordered Triangular Factorization," EEE Proceedings, Vol. 55, No. 11, pp. 1801–1809, Nov. 1967.

Gustavson et al., "Symbolic Generation Of An Optimal Crout Algorithm For Sparse Systems Of Linear Equations," J. Assoc. Comput. Mach., Vol. 17, No. 1, Jan. 1970, pp. 37–109.

Hachtel et al., "A Variational Approach To The Optimal Design and Synthesis Of Switching Circuits," IEEE Proceedings, Vol. 55, No. 11, Nov. 1967, PP. 1864–1877.

Fletcher et al., "A Rapidly Convergent Descent Method For Minimization," Computer Journal, Vol. 6, 1965, pp. 163–168.

*Primary Examiner*—Joseph F. Ruggiero

*Attorney*—Hanifin and Jancin and Victor Siber

[57] ABSTRACT

An automated process for network optimization which fully incorporates sparse matrix techniques. The system has further application to any generalized system which may be described mathematically by a set of algebraic and differential equations. Operating on a user input which defines X electrical network, the system generates lists of formated data representing a set of algebraic and differential equations. The variables in the equations are solved for by a process of Crout elimination, and each resulting operation in the Crout algorithm is identified in accordance with one of a plurality of variablility types. Then, a separate Solve program code for each variability type is compiled by the system. The individual Solve programs are then executed in a hierarchical loop sequence during the solution of the network design problem by means of a Newtonian iteration which is expressed as $\delta A(X)/\delta X \ \Delta X = -A(x)$. Where $A(x)$ represents a tableau vector consisting of a set of algebraic and differential equations for the electrical network.

18 Claims, 14 Drawing Figures

NETWORK

AUGMENTED NETWORK MODEL

INVENTORS
ROBERT K. BRAYTON
FRED G. GUSTAVSON
GARY D. HACHTEL

BY Victor Siber
AGENT

INPUT PROCESSING

EXECUTION

FIG. 10

| RPM | STORAGE LOCATION | CIM | STORAGE LOCATION | A | A1 (VARIABILITY TYPE) | A11 (MATRIX ELEMENT POINTERS) |
|---|---|---|---|---|---|---|
| 1 | (1) | 8·3+0 | (1) | 1 | 1 | 1 |
| 3 | (2) | 8·4+0 | (2) | −1 | 1 | 1 |
| 5 | (3) | (3) 8·4+1 | (3) | L(P1) | 2 | 2 |
| 7 | (4) | 8·5+0 | (4) | i2(∂L/∂p1) | 1 | 1 |
| 10 | (5) | (5) 8·1+0 | (5) | ∂ψ/∂v2 | 1 | 1 |
| 12 | (6) | 8·6+1 | (6) | ∂ψ/∂v3 | 2 | 2 |
| 13 | (7) | (7) 8·1+0 | (7) | ∂φ/∂v3 | 1 | 1 |
| 16 | (8) | 8·2+1 | (8) | ∂φ/∂p1 | 2 | 2 |
| 19 | (9) | 8·7+1 | (9) | −(d/dt) | 2 | 2 |
| 21 | (10) | (10) 8·2+0 | (10) | −(d/dt) | 1 | 1 |
| 24 | (11) | 8·8+1 | (11) | −(d/dt) | 2 | 2 |
| 26 | (12) | (12) 8·6+0 | (12) | −(d/dt) | 1 | 1 |
| 28 | (13) | (13) 8·4+3 | | | 4 | 3 |
| 30 | (14) | 8·9+5 | | | 6 | 4 |
| 31 | (15) | 8·11+1 | | | 2 | 2 |
| | (16) | (16) 8·7+5 | | | 6 | 5 |
| | (17) | 8·8+5 | | | 6 | 6 |
| | (18) | 8·12+1 | | | 2 | 2 |
| | (19) | (19) 8·9+1 | | | 2 | 2 |
| | (20) | 8·14+0 | | | 1 | 1 |
| | (21) | (21) 8·8+5 | | | 6 | 7 |
| | (22) | 8·9+5 | | | 6 | 8 |
| | (23) | 8·10+1 | | | 2 | 2 |
| | (24) | (24) 8·7+0 | | | 1 | 1 |
| | (25) | 8·11+4 | | | 5 | 9 |
| | (26) | (26) 8·5+0 | | | 1 | 1 |
| | (27) | 8·12+4 | | | 5 | 10 |
| | (28) | (28) 8·10+0 | | | 1 | 1 |
| | (29) | 8·13+4 | | | 5 | 11 |
| | (30) | (30) 8·14+4 | | | 5 | 12 |

| | 6 | 1 | 14 | 9 | 3 | 13 | 10 | 5 | 2 | 8 | 11 | 7 | 12 | 4 | | | |
|---|---|---|---|---|---|---|---|---|---|---|---|---|---|---|---|---|---|
| 6 | 1 | | | | | | | | | | | | | | dv1 | | f(6) |
| 3 | −1 | 1 | | | | | | | | | | | | | dV1 | | f(3) |
| 14 | | | $\frac{-d}{dt}$ | | | | | | | | | | | | $d\dot{p}$ | | f(14) |
| 9 | | | 1 | −1 | | | | | | | | | | | dp1 | | f(9) |
| 1 | | | | | 1 | | | | | | | | | 1 | di1 | | f(1) |
| 13 | | | | | | $\frac{-d}{dt}$ | 1 | | | | | | | | $d\dot{\phi}$ | | f(13) |
| 10 | | | | $-\frac{\partial \phi}{\partial p}$ | | | −1 | | | $\frac{\partial \phi}{\partial v3}$ | | | | | $d\Phi$ | = − | f(10) |
| 2 | | | | | | | | 1 | | | | | | −1 | di3 | | f(2) |
| 4 | | 1 | | | | | | | −1 | | | −1 | | | dV2 | | f(4) |
| 5 | | | | | | | | | 1 | −1 | | F | | | dv3 | | f(5) |
| 7 | | | | $i2\frac{\partial L}{\partial p1}$ | | | | | | | −1 | | | L(P) | dq2 | | f(7) |
| 8 | | | | | | | | | | $\frac{\partial \psi}{\partial v3}$ | | $\frac{\partial \psi}{\partial v2}$ | −1 | | dv2 | | f(8) |
| 11 | | | | | | | | | | | $\frac{-d}{dt}$ | 1 | F | F | dq3 | | f(11) |
| 12 | | | | | | | | 1 | | | | | $\frac{-d}{dt}$ | F | di2 | | f(12) |

FIG. 12

CROUT ALGORITHM GNSO FACTORIZATION

| | | |
|---|---|---|
| C1 = a12 | C12 = a29 | C22 = 1/C22 |
| C2 = a6 | C12 = 1/C12 | C24 = −C20 * C21 * C22 |
| C1 = 1/C1 | C13 = a28 * C12 | C25 = a13 |
| C3 = a5 | C14 = a21 | C26 = a25 |
| C4 = a7 | C14 = 1/C14 | C25 = 1/C25 |
| C3 = 1/C3 | C15 = a22 * C14 | C27 = a14 * C25 |
| C5 = a30 | C16 = a4 | C28 = −C24 * C23 + a17 |
| C6 = a20 | C17 = a26 | C29 = a24 |
| C5 = 1/C5 | C16 = 1/C16 | C28 = 1/C28 |
| C7 = a19 | C18 = a3 * C16 | C30 = a16 * C28 |
| C8 = a23 | C19 = a8 | C31 = −C30 * C29 |
| C9 = a15 | C20 = a10 | C32 = a27 |
| C7 = 1/C7 | C19 = 1/C19 | C31 = 1/C31 |
| C10 = a1 | C21 = a9 * C19 | C33 = −C26 * C27 * C31 |
| C10 = 1/C10 | C22 = a11 | C34 = −C18 * C17 − C33 * C32 |
| C11 = a2 * C10 | C23 = a18 | C34 = 1/C34 |

FIG. 13

123-GNSO FACTORIZATION

| | | |
|---|---|---|
| C TYPE | C1 = 1. | C10 = A9 |
| | C2 = −1. | C11 = −A3 |
| T TYPE | C3 = A12 | C12 = C9 + A5 |
| | C3 = 1/C3 | C12 = 1/C12 |
| X TYPE → | C4 = A8 | C13 = −C12 |
| | C5 = A4 | C14 = + C13 |
| | C6 = A11 | C15 = A10 |
| | C6 = 1/C6 | C14 = 1/C14 |
| | C7 = −C6 | C16 = −C10 * C11 * C14 |
| | C8 = −A7 | C17 = −C15 * C16 + C1 |
| | C9 = A6 | C17 = 1/C17 |

TABLEAU NETWORK DESIGN SYSTEM

BACKGROUND OF THE INVENTION

The present invention relates to an automatic process for solving a set of algebraic and differential equations by sparse matrix techniques. More specifically, it relates to a method of optimizing an electrical network design objective by structuring the problem in a tableau arrangement which leads itself to solution by sparse matrix techniques.

Since the development of large digital computers, matrix techniques have taken on a very significant role in the solution of mathematical and statistical problems of immense magnitude. But with an ever increasing use, in the solution of larger and larger problems, it was soon realized that methods were needed to reduce the number of machine calculations and required computer storage in matrix operations. An early approach to the problem was suggested by the observation that large matrices arising in certain applications of importance are, for various reasons, sparse. That is, they have only a thin population of non-zero elements amid vast expanses of zeros. Frequently upwards of 95 percent of the elements in the typical row of a very large matrix consists entirely of zeros. For example, in linear programming, where variables usually represent economic activities of some kind and the coefficients of the variables represent economic resources, matrices are sparse because most of the activities make demands on relatively few of the resources at any given time. In electrical networks, matrices tend to be sparse because typically, only a few nodes in a network are directly connected with each other, and those few are usually connected locally. These wire connections do not change, only the currents flowing through them change. As a result, the basic zero, non-zero structure of sparse matrices which represent electrical networks tend in many cases to assume a fixed pattern in which only the values of non-zero terms change from one problem to another. By recognition of the nature of the sparse matrices, several techniques are here developed which take advantage of the fixed sparsity pattern so that time-wasting operations with zeros such as multiplications and additions, could be bypassed and only the calculations with the non-zero elements would be performed.

In recent years, a general purpose computer program known as SCEPTRE, which is described in S. Sedore, et al., "An Automated Digital Computer Program for Determining the Response of Electronic Systems," Vol. II, IBM. Space Guidance Center, Owego, N.Y., Technical Report AFWL-TR-66-126, February 1967, has gained wide acceptance. SCEPTRE combines symbolic pre-processing (the so-called "state-variable" approach) with explicit numerical integration procedures to avoid solving linear equations. The price paid for this omission is the necessity of taking a prohibitively large number of time iterations to avoid numerical instability. Implicit numerical integration procedures avoid this instability problem while requiring only a minimum number of time iterations. However, implicit procedures involve the solution of nonlinear algebraic equations via Newton's method as described above. This in turn required programs for solving matrix equations, and before the advent of Sparse Matrix Technology, such programs entailed prohibitive execution times for the large matrices arising in network design problems of practical importance.

The field of computer aided network design is evolving rapidly as sparse matrix technology develops. A prior work which played a significant role in this development is disclosed in a paper presented by W. F. Tinney and J. W. Walter, "Direct Solution of Sparse Network Equations by Optimally Ordered Triangular Factorization," *IEEE Proceedings*, Volume 55, No. 11, November 1967, pages 1801-1809. This paper addresses the application of sparse matrix techniques to electrical power generation and distribution systems. In this application the networks to be analyzed are assumed to be linear time invariant (therefore there is only one variability type) and the matrices which arise are symmetric. Also the sparse matrix technique used by Tinney et al. is interpretive. That is, each instruction used for solving $Ax=b$ must be generated each time it is executed. This becomes a prohibitive restriction in general purpose automated network design because it is typical for $Ax=b$ to be solved $\approx 10^5$ times per design problem.

Another key development in Sparse Matrix Technology is presented in a paper by F. G. Gustavson, W. Liniger and R. A. Willoughby, "Symbolic Generation of an Optimal Crout Algorithm for Sparse Systems of Linear Equations," *J. Assoc. Comput. Mach.*, Vol. 17, No. 1, January 1970, pp. 87-109. This paper described techniques applicable to general non-symmetric matrices but again does not account for variability type. Thus, when applied in hierarchical loop computations of typical network design, operations used in solving $Ax=b$ by this technique are needlessly repeated. This paper was the first to describe *symbolic* rather than interpretive code generation. That is, the instructions are generated once only and could be reused indefinitely. However, the code generated was FORTRAN code, rather than machine code. Consequently, prohibitively large storage requirements for keeping this code in core arose for network design problems of significant size.

Another development in the prior art in the field of Computer-Aided Network Design indirectly related to Sparse Matrix Technology is described in the paper by G. D. Hachtel and R. A. Rohrer, "A Variational Approach to the Optimal Design and Synthesis of Switching Circuits," *IEEE Proceedings*, Vol. 55, No. 11, November 1967, pp 1864-1877. In this paper a method of computing the sensitivity (i.e., the gradient) of a design objective function with respect to variations in the designable parameters is given. Also, described therein is a technique for using these sensitivity gradients with gradient-oriented nonlinear programming algorithms. For example, the algorithm presented by R. Fletcher and M. J. D. Powell, "A Rapidly Convergent Descent Method for Minimization," *Computer J.*, Vol. 6, 1965, pp. 163-168. Such algorithms have generally superior convergence properties which are essential to the success of automatic computational design optimization. However, this process presented in this paper is limited to the design of a specific network only, as opposed to the applicability of the present invention to any network whatsoever.

At the present state of the art, there are no general purpose programs for network design optimization via gradient oriented optimization algorithms. All the programs and techniques described above treat only the analysis phase of design, i.e., they relate to determining the value of the design objective function for a given set of designable parameters. However, they give no information about how to change the parameters in order to improve the design.

The present invention overcomes the limitations of the prior art listed above by means of the following processes:

1. A basic sparse matrix technique applicable to matrices of arbitrary zero-nonzero structure and to matrices with several different variability types, and which produces an optimum (minimum) number of re-executable machine code instructions (referred to as SOLVE code). Thus, optimum execution speed is obtained with minimum storage requirements.

2. A tableau approach to problem formulation which:

a. sets up the algebraic-differential equations in a way which maximizes the sparsity of the coefficient matrix corresponding to a given network structure;

b. implements the required implicit numerical integration formula at the network branch-element level. Thus, extra matrix operations (e.g., multiplication) characteristic of the state-variable approach and other classical network methods are incorporated in the highly efficient Solve code;

c. sets up the adjoint sensitivity calculation at the branch-element level so that the extra matrix operations which were necessary in the prior art for computing the sensitivity gradients (required for automatic optimization) are incorporated into the highly efficient Solve code;

d. enables the data (required for exploiting variability type in the sparse matrix procedure) to be obtained from a general purpose, user oriented input language.

OBJECTS OF THE INVENTION

Therefore, it is an object of the present invention to automate a network optimization process by means of a computer input format structure that enables solution of a network optimization problem by the use of sparse matrix techniques.

It is a further object of the present invention to provide a method for automatically arranging electrical network definitive user input data into a tableau vector and tableau matrix so as to enable a network optimization problem to be solved by automatic data processing sparse matrix solution procedures.

It is a further object of the present invention to reduce the number of computer operations required to solve the generalized problem $Ax = b$, where A consists of a sparse matrix.

It is a further object of the present invention to automatically solve a large sparse matrix system by an elimination method that automatically compiles a set of computer machine instructions for automatically determining every non-zero element of the solution vector $x = A^{-1}b$ and group the set of computer instructions for processing matrix elements according to variability type and executing each variability type group in its own hierarchical loop.

It is a further object of the present invention to automatically optimize a network design function by means of gradient oriented nonlinear programming algorithms while making utilization of sparse matrix characteristics of the electrical network definitive.

It is a further object of the present invention to provide a method of implementing implicit, variable order, variable step time integration procedures, as well as adjoint sensitivity gradient computations at the network branch-element level, so that the only matrix operation performed in the optimization is that of solving $Ax = b$, where A represents a sparse matrix.

It is a further object of the present invention to reduce the amount of computer storage required during the solution of a large sparse matrix problem.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 10 defines the "list 1" storage format for the matrix shown in FIG. 9.

FIG. 12 is a list of the compact matrix elements expressed in terms of the elements of the matrix shown in FIG. 9.

FIG. 13 is a final list of the compacted Crout matrix of FIG. 11(A).

SUMMARY OF THE INVENTION

Figure 1:
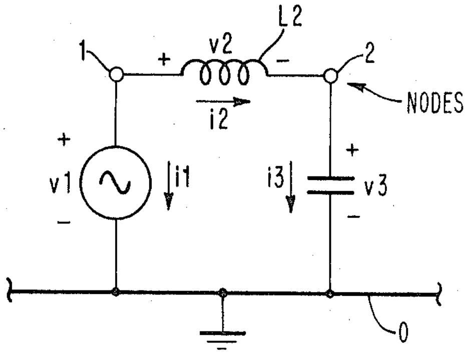
FIG. 1 is an electrical network for which the frequency of the electrical signal passing through the circuit is to be optimized to some desired value.

In the present invention an automatic process for optimizing an electrical network design function is provided. The process consists of a set of programs that operate on electrical network definitive input data supplied by a user. After having arranged the definitive input data in a tableau vector format which represents a set of algebraic and differential equations for the electrical network, the system solves these equations via nested time domain and non-linear Newton iterations and computes the network design function for a given set of design parameter values. The system then solves an adjoint set of algebraic equations for the sensitivity of the network design function with respect to these parameter values. The sensitivities are then used in a nonlinear programming algorithm to select a better value of the parameters. This process is repeated until an optimum set of parameters is attained.

The first phase of the system utilizes an input processing program that reads in the electrical network definitive user input data. This data also includes the design objective function and those functions which represent constituent branches of the electrical network, for example, source elements. The input processing program formats in a compact notation, a tableau matrix that is in effect the Jacobian of the tableau vector. The format consists of a plurality of pointer lists which make efficient use of computer storage by being completely descriptive of the matrix without the necessity of storing ± 1 or 0 elements.

The second phase of the program loads into the computer processor the formated lists which represent the Jacobian matrix of the electrical network, and executes an outer parameter iteration beginning at some users specified initial parameter value, an inner swept variable, referred to henceforth as time, but it would be clear that any swept variable is applicable time iteration over a specified range of time, and an innermost Newton iteration which computes the roots of the tableau vector. The process is continued for each increment of the design parameter until an optimum solution is achieved. The design parameter is incremented using the gradient calculation which involves another time iteration over the same specified time range.

During the Newton iteration, it is necessary to repetitively calculate matrix element values for each increment of a variable in the tableau vector. Therefore, the system organizes a plurality of Solve computer program codes, one for each variability type of element in the matrix. Specifically in electrical networks there are three variability types, elements which are constant (c), elements which vary with respect to time (T), and elements which vary with respect to other variables in the circuit (X).

The Solve programs are executed in a hierarchical group structure. That is, the C-Solve program is executed first for a specific set, $p$, of design parameter values. Then, the T-Solve program is iteratively executed over the entire range of time specified by the user. And for each time increment $\Delta T$ the X-Solve program is repetitively executed during Newton's iteration. The resulting network solution is tested to determine whether the design function has converged onto the design objective function. If convergence is not present a new set, $p$, of design parameters is chosen and the C-solve code re-executed, and the whole cycle repeated. Thus, C-solve is executed once for each design parameter set $p$, T-Solve once for each time step for a given $p$, and X-Solve once for each Newton step at a given time. These three nested iterations are repeated until an optimum value of the network design function is attained.

DESCRIPTION OF THE INVENTION

The inventive process disclosed herein provides a method for automatic electrical network optimization which fully incorporates sparse matrix methods. Furthermore, the general techniques presented have application to any problem which can be described mathematically by a set of algebraic and differential equations.

Throughout the following description, in order to facilitate understanding of the invention, it is assumed that all user supplied data is error-free. Furthermore, it should be recognized by those skilled in the art that it would be obvious to provide appropriate error-checking steps in the process in order to insure input validity.

The preferred embodiment described herein, illustrates the inventive process for optimizing a design function that expresses the relationship of voltage in the element in the third branch of a user-defined network as a variable with respect to time. It should be recognized by those skilled in the art, that this example is merely illustrative and the process is completely general and capable of operating on any design function and/or user-defined network. Furthermore, while the process as shown herein is described in terms of operating on an electrical circuit, it should be understood that the system is not limited to such application and the adaptability of the inventive process to other optimization problems is perfectly within the ordinary skill of the art.

The tableau network design system as described herein may be executed by any general purpose computer having sufficient storage and input/output capability. For example, an IBM system 360, model 65 with 256,000 bytes of storage, disk or tape, CRT display or card reader input and a printer or display unit as an output device. The physical arrangement of input/output equipment to the central processing unit are within the skill of the art and need no further discussion. For a further description of the exemplary computer system, reference should be made to the following IBM system reference library manuals: IBM System/360 System Summary, Form GA22-6810; IBM System/360 Principles of Operation, Form GA22-6821; IBM System/360 Model 65 Configurator, Form GA22-6887; IBM System/360 Input/Output Configurator, Form GA22-6823. Furthermore, it is assumed that the complete computer system consisting of the central processor and input/output equipment is operating under control of the IBM System/360 Operating System which is described in the following manuals:

IBM System/360 Operating System: Job Control Language Reference, Form GC28-6704

IBM System/360 Operating System: Job Control Language User's Guide, Form GC28-6703

IBM System/360 Operating System: Concepts and Facilities, Form GC28-6535

- IBM System/360 Operating System: System Programmer's Guide, Form GC28-6550
- IBM System/360 Operating System: Supervisor and Data Management Services, Form GC28-6646
- IBM System/360 Operating System: Supervisor and Data Management Macro Instructions, Form GC28-6647
- IBM System/360 Operating System: Utilities Form GC28-6586
- IBM System/360 Operating System: FORTRAN (G and H) Programmer's Guide, Form GC28-6817

Referring to FIG. 1, there is shown an exemplary electrical network which is specified by a user of the automated process. Also specified by the user, is a request to optimize the following design objective for the network of FIG. 1:

$$\Phi=\int_0^{TF} \phi(V3, p^1t)\,dt$$

In this example, the user requests by means of his input data that the automatic process minimize the scalar objective functional Φ, where φ is a function of *v*3 which is the voltage across branch 3 of the network, and p1 which is the vector of a designable parameter of the circuit, and *t* which represents the time vector. Note that the designable parameter *p*1 is a physical variable which the user can control to achieve a desired optimum result. For example, the size of the number of turns of wire on the induction core could be varied by the user so as to minimize the function Φ. In the specific example considered herein, the design objective function is:

$$\Phi=\int_0^{TF} (v3-\sin\theta)\,dt \text{ where } 0=t/2\pi\sqrt{pl}$$

Figure 3:
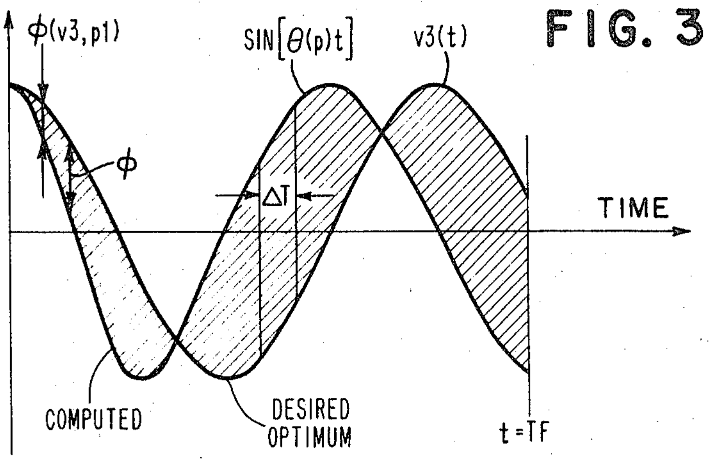
FIG. 3 is a graphic representation of the design function $\phi$ which represents the difference between an electrical signal of desired frequency and the signal which is computed for a particular design parameter P1.

Referring now to FIG. 3, there is shown a graphical representation of the function φ, which is the instantaneous difference between the desired optimum sinusoidal waveshape sin θ*t* and the iteratively computed signal waveform *v*3(*t*) for an interim value of *p*1. It should be recognized that while the specific objective in this case is shown to be frequency, other objective functions could just as easily be optimized, for example, power or efficiency of the electrical network. Regardless of the design objective, there is always one or more designable parameters *p*1, *p*2 . . . *pn* which the user may vary to effect the optimum objective. In the specific case chosen, in order to maintain simplicity for ease of understanding the inventive process, only a single parameter *p*1 is provided.

It should be understood by those skilled in the art that while in the specific example under consideration, *t* is chosen as the swept variable, the process is not limited to this case. The user of the process could specify any other sweep variable or if desired, the problem could be defined without a sweep variable. Furthermore, while the inventive process is disclosed in terms of a design problem, it should be obvious that the process can also be used to provide a transient response of a circuit, d.c. results, design parameter sensitivity calculations and other calculations which are subprocesses of the network optimization system.

Figure 4:
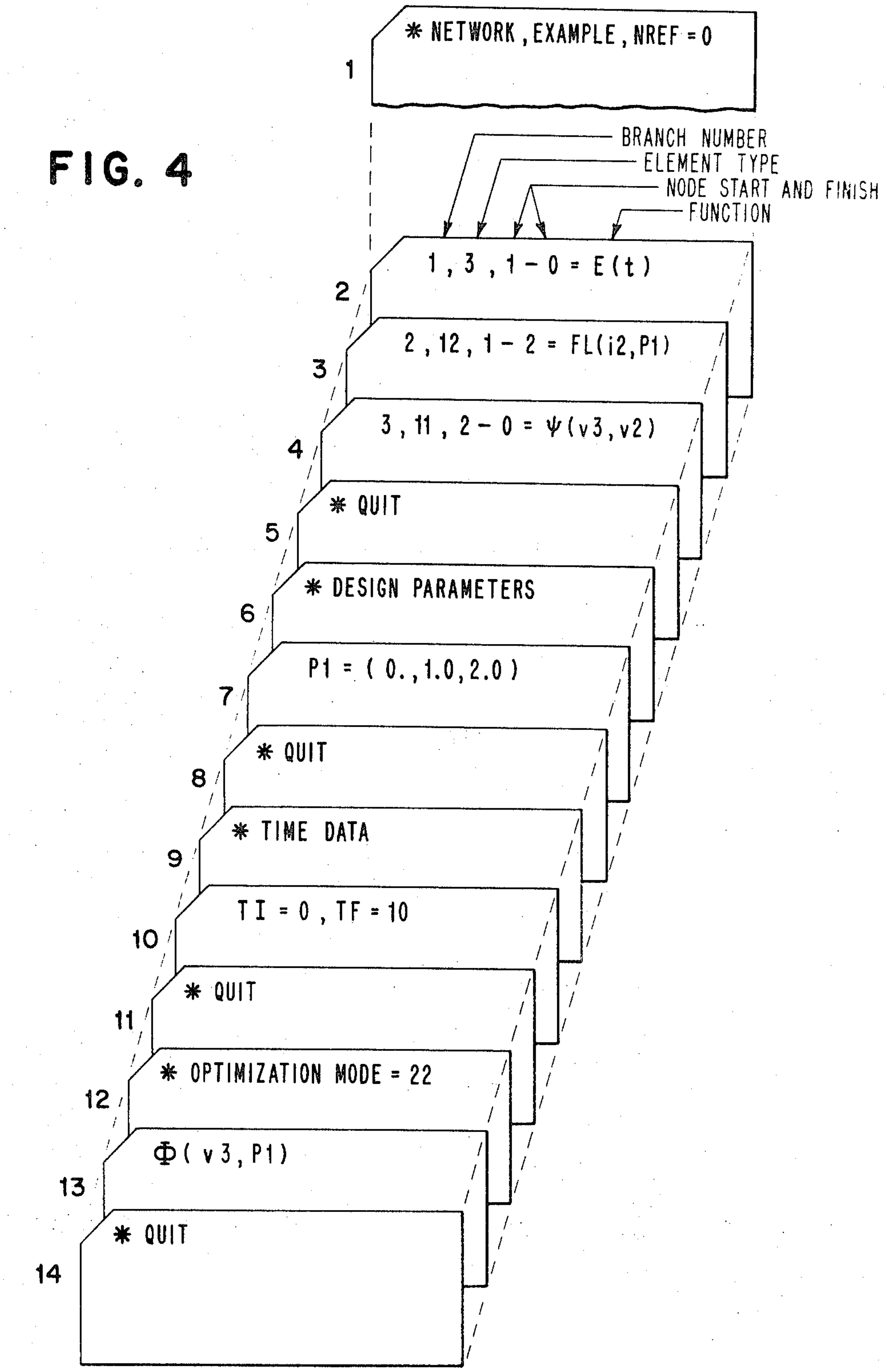
FIG. 4 represents a sequence of user input data which completely identifies the network of FIG. 1 and the design objective and parameters.

In order for the computer to execute the design process with the specific network shown in FIG. 1, the user must identify such network in terms of network definitive input data. This is accomplished by means of a series of data cards written in a free format as shown in FIG. 4. Then, the automated process by extrapolating from the data card input generates additional virtual circuit elements by an internal augmentation scheme. The virtual circuit elements incorporate the design function and parameters into a model of the network which is then expressed in terms of a tableau vector.

Given the particular network of FIG. 1, it is the objective of the program process to solve for some optimum value of parameter *p*1. This is accomplished by first defining an augmented network model which includes the original circuit elements and the virtual circuit elements in terms of a tableau vector, as follows:

$$f=f(V,i,v,q,\Phi,p,t,)$$

After having the tableau vector which completely describes the electrical network as a system of algebraic and differential equations, the convergent roots of the tableau vector are computed by means of a Newtonian iteration which may be expressed in general as:

$$xn+1=xn-\left(\frac{\delta f}{\delta xn}\right)^{-1} f(xn)$$

where $n = 1, 2, \ldots$ N. And since the design objective function is included in the tableau, it can be tested for optimization each time the final time T (i.e., $n$ = N) is attained to determine whether in fact the current value of *p*1 is an optimum.

Figure 8:
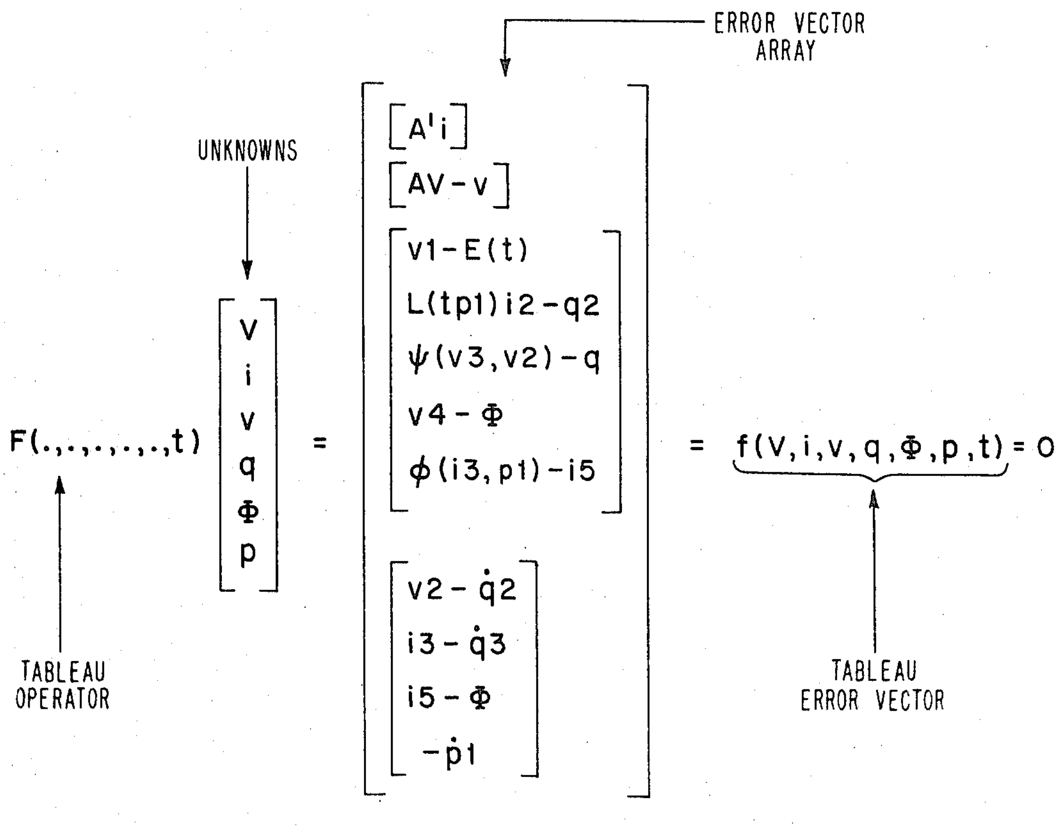
FIG. 8 is a representation of the relationship between the tableau operator, the unknown vector and the tableau error vector.
Figure 9:
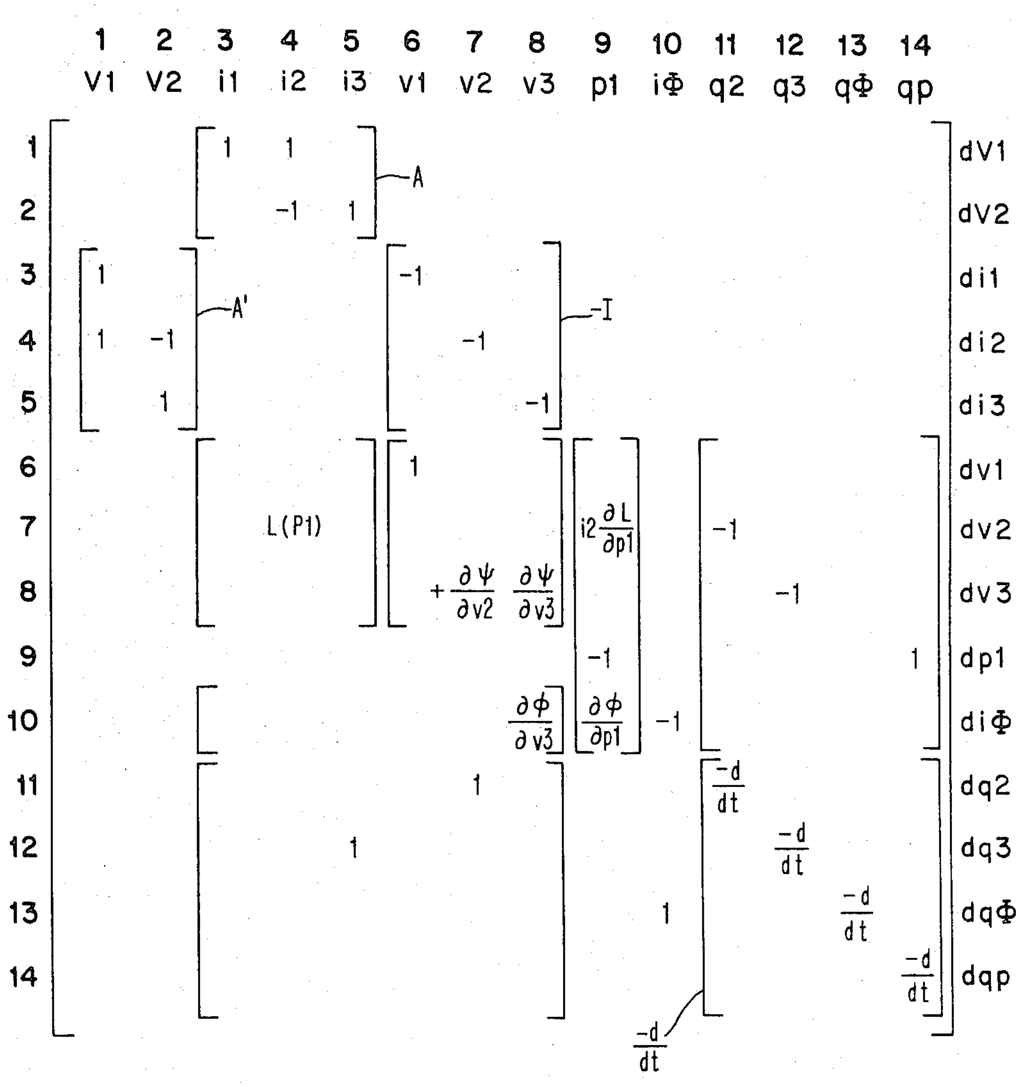
FIG. 9 is a matrix representation of the Jacobian of the tableau vector for the augmented network shown in FIG. 2.

After the network of FIG. 1 is augmented to develop a tableau vector, it is then readily convertible to a Jacobian matrix of the tableau vector $\delta f/\delta x$ which matrix shall be referred to herein as a Tableau Matrix. The relationship between the vector and the matrix is shown in FIGS. 8 and 9.

Input Processor

Referring now to FIG. 4, there is shown the specific format of the input cards that completely define the network shown in FIG. 1. Cards 2–4 are preceded by a header card identifying the name of the problem network (i.e., "example") and the reference node to be node 0. Now, considering the second card, there is shown specific identifiers written in a free format, with data delimited by commas, minus signs and equal signs. The second card shows that branch number 1 is identified as a type 3 element (a voltage source) and starts at node number 1 and finishes at the reference node 0. On the same data card, the user also specifies the name of a function E(*t*). This E(*t*) is given a tag name identical with either a subroutine or a table in storage from which the program can determine the voltage across branch number 1 for any particular time *t*. The implementation of storing a function or a table within storage is well within the ordinary skill of the art and needs no further discussion at this point. Similarly to data card number 2, cards 3 and 4 contain identifier information with regards to branches number 2 and 3.

The next header card identified as DESIGN PARAMETERS precedes all of the variables which the user identifies as being subject to the design process. In this case, the only design parameter identified is *p*1, which is also given a specified starting value of 1.0 and is constrained to be contained in the interval (0, 2.0). The next header card, number 9, is labeled TIME DATA and allows the user to restrict the process to a specific time period as done in the subsequent card 10. Specifically, in this example, the user requires that the optimization process is to be carried out beginning at time $t = 0$ and carried out until time $t = 10$. Then, in the next header card the user requests a specific arbitrarily optimization mode referred to herein as 22. In this case, the number 22 refers to a minimization process for the function identified by the user as Φ (v3, p1). This function represents the area between a desired signal curve and a computed signal curve which are out of phase as shown in FIG. 3. Therefore, if the function Φ is minimized by the process, then the computed curve will be brought into phase with the desired curve thus achieving the specific optimization desired. Note, that following each of the header cards, there if a QUIT control statement which is used by the input processing program to recognize that certain segments of input data are complete.

Figure 2:
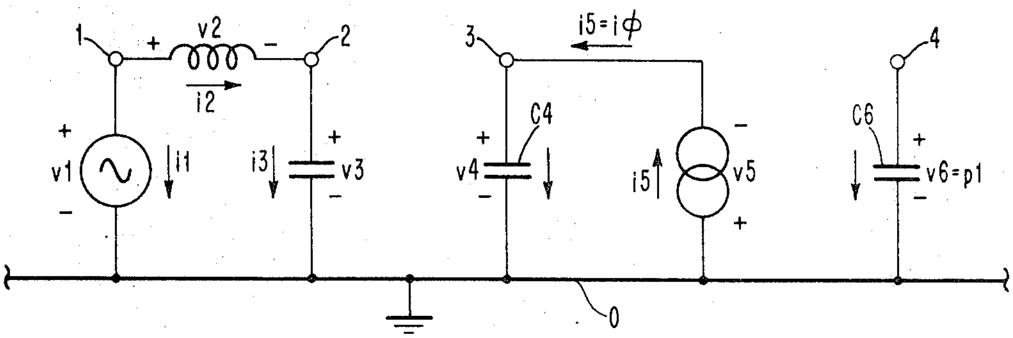
FIG. 2 is an augmented model of the circuit of FIG. 1 which contains an objector (a virtual circuit element) and a parameter (virtual circuit element).
Figure 5:
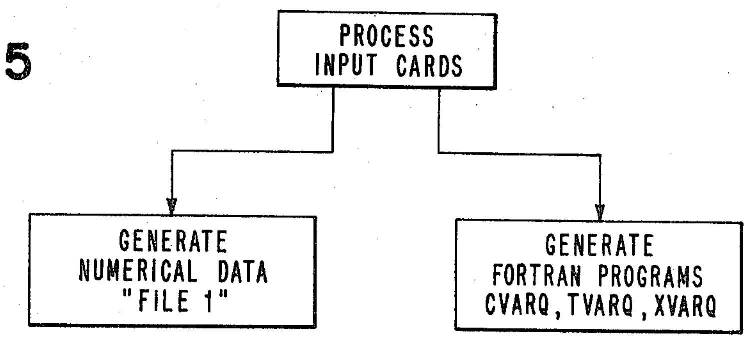
FIG. 5 is a logic flow diagram representing the input processing of the electrical network definitive data supplied by the user.

Now, referring to FIG. 5 in conjunction with the input data cards supplied by the user (FIG. 4), the sequence of operations for formatting the tableau error vector of FIG. 8 of the tableau matrix of FIG. 9 will be described. The tableau error vector consists of a FORTRAN representation of a set of equations that completely describe the network shown in FIG. 2. In order to compute the tableau vector, the input processing program first extrapolates from the network definitive input data virtual circuit elements which augment the original network and form a complete model of the network system. The augmentation can be considered as consisting of two separate parts, an objector and a parameter. With reference to FIG. 2, the objector is formed by adding a current source $i5 = \Phi(v3,p1)$ which is connected to a unit capacitance. This dependent current source introduces the design objective function into the network model. In addition, a parameter virtual circuit element identified as capacitor C6, having a unit capacitance and a charge $q = p$ is connected to 0 reference. The addition of the three virtual circuit elements completes the augmented network model from which the tableau vector is then derived.

Referring to FIG. 8, the relationship between the tableau error vector and the tableau matrix is shown. Specifically, the error vector consists of a function of six unknowns $V,i,v,q,\Phi,p1$, and time $t$. This same vector is equivalent to an array of unknown vectors which are formed from three basic relationships, Kirchoff's voltage law, Kirchoff's current law, and the branch constitutive relations.

Referring to the augmented network model shown in FIG. 2, it can be seen that the tableau vector will consist of two vector equations satisfying the Kirchoff's current law at nodes 1 and 2, three vector equations satisfying Kirchoff's voltage laws at the branches 1, 2 and 3 in the circuit, five scalar equations relating to the five branch constitutive relations of branches 1–5 and finally four scalar equations describing each of the reactive elements in the augmented circuit. Thus, the tableau error vector will present a list of 14 equations which are as follows:

| | | |
|---|---|---|
| $0 = i1 + i2$ (1) | | Kirchoff's current law |
| $0 = i2 + i3$ (2) | | |
| $0 = V1 - v1$ (3) | | Kirchoff's voltage law |
| $0 = V1 - V2 - v2$ (4) | | |
| $0 = V2 - v3$ (5) | | |
| $0 = v1 - E(t)$ (6) | | branch constitutive relationships |
| $0 = L(p1)i2 - q2$ (7) | | |
| $0 = \psi(v2, v3) - q3$ (8) | | |
| $0 = -p1 + qp$ (9) | | |
| $0 = \phi(v3, p1) - i\phi$ (10) | | |
| $0 = v2 - dq2/dt$ (11) | | scalar equations for reactive elements |
| $0 = i3 - dq3/dt$ (12) | | |
| $0 = i\phi - dq\phi/dt$ (13) | | |
| $0 = dqp/dt$ (14) | | |

The 14 equations listed above represent a mathematical system completely descriptive of the network of FIG. 2. In order to make this mathematical system understood by the tableau network design system, the input processing program generates a set of Fortran instructions that represent an array equivalent to the 14 algebraic and differential equations. Note that all of the variables in the equations are then identified by the notation $x$ followed by a number 1–14. Thus, the FORTRAN statements can be correlated with the matrix shown in FIG. 9 by considering the leftmost column as $x(1)$ and the rightmost as $x(14)$ and the numbering of rows corresponding to the FORTRAN statements beginning with the top row identified as row number 1. Then, the mathematical system can be described by the following 14 program code relationships:

```
F(1)=x(3)+x(4)
F(2)=-x(4)+x(5)
F(3)=x(1)-x(6)
F(4)=x(1)-x(2)-x(7)
F(5)=x(2)-x(8)
F(6)=x(6)-E(t)
A(3)=FL[x(9), DLDP1]
A(4)=x(4) * DLDP1
F(7)=x(4) * A(3)-x(11)
F(8)=ψ[x(7), A(5), x(8), A(6)]-x(12)
F(9)=-x(9)+x(14)
F(10)=φ[x(8), A(7), x(9), A(8)]-x(10)
F(11)=x(7)-DDT[x(11), A(9)]
F(12)=x(5)-DDT[x(12), A(10)]
F(13)=x(10)-DDT[x(13), A(11)]
F(14)=-DDT[x(14), A(12)]
```

Note that the FORTRAN function subprogram DDT is part of the present system and, given, say $x(11)$, returns in location DDT the backward, kth order, numerical differential formula for $dx(11)/dt$ (c.f. Isaacson and Keller, *Methods of Numerical Analysis*, Wiley, New York, 1967, Chapt. 5). The present system automatically adjusts the order k and the time step, DT, in order to minimize the amount of time steps required.

By examination of the tableau matrix of FIG. 9, which corresponds to the list of Fortran code, it is apparent that certain constituent groups of the tableau matrix bear a distinct interrelationship which is taken advantage of by the program to reduce run time and storage requirements. For example, sub matrix A is equal to the transpose of matrix A'. This is an expected result since the matrix representation of the Kirchhoff's current laws and voltage laws are generally known to be expressable as the transpose of each other. By means of this relationship, the input processing program need only develop the code for the branch voltage equations. Then, the sub matrix A' is used to generate the transform A thus satisfying the equations F(1) and F(2).

Another apparent relationship which has general application to any network problem is that a diagonal matrix of −1 identified as −I will always be identified with the Kirchhoff voltage tableau vector equations. Therefore, the input processing program automatically makes an entry of −1 for each of the tableau vectors in its appropriate column. Other relationships which are used by the input processing program are dependent on the network that is being optimized. For example, if the network contains reactive elements, it is known that in the lower right-hand corner of the matrix in FIG. 9, there will be a constituent sub matrix identified as $-d/dt$ consisting of a diagonal matrix of the derivative with respect to time for the $q$ variables of the elements. The identification of sub matrix relationships are useful techniques performed by the input processing program, but it should be recognized that these techniques need not be utilized since the program can develop each of the matrix elements by sequential processing of the network definitive input data.

First considering the generation of the A and the A′ sub matrices, the input processing program looks at the network identifier cards following the first header card in sequence and makes entries into a storage area that represents the tableau vector. The second data card identifies branch number 1 as having a type element number 3, which to the input processing program represents a voltage source. Further, the card states that the branch is connected between node 1, and reference node 0, and that the voltage function of the element type is expressed as $E(t)$.

From the information on the second data card, the program automatically fills in the tableau vector FORTRAN equation for branch 1 representing Kirchoff's voltage law at that branch. This equation would be expressed as $F(3)=x(1)-x(5)$, which indicates that the third row in the tableau matrix array is equal to a 1 entry in the first column and a −1 entry in the sixth column. Thus, the program has expressed the relationship that the node voltage V1 minus the branch voltage $v1$ is equal to 0. The remaining tableau vectors are formed in a similar manner for the remaining two user defined branches. Thus, completing the formation of the A′ sub matrix from which the input processing computes the transform matrix A so as to develop the node equations at nodes 1 and 2 in terms of tableau vectors, the first node equation being $F(1) = x(3) + x(4)$.

In order to make efficient use of computer time, the program fills in the transform matrix as each of the subelements in the A matrix are calculated and does not wait until the complete matrix A′ is computed before finding the transform A. The input processing program operates sequentially on the branches. Thus, since branch number 1 was selected first for which the equation F(3) was generated, the program continues to operate on branch number 3 since all of the data relating to that branch is already in the appropriate tables and storage locations within the computer.

The next tableau vectors to be computed are the branch constitutive equations for branch 1. Beginning with the branch 1, the equation identified as F(6) and represented as row number 6 in the matrix of FIG. 9. The constitutive equation for branch 1 merely expresses the relationship that the voltage at node 1 is equal to $E(t)$ therefore the only entry in the matrix is a 1 entry at row 6, column 6, and the tableau vector as defined in the equation $F(6)=X(6)-E(t)$ is placed in the matrix storage area. The branch constitutive equations for branch numbers 2 and 3 would be found in a similar manner and would also be placed in their appropriate storage locations.

Variable Quantity Processing

In the computation of the branch constitutive equations for each the branches that contain reactive elements such as L and C, the input processing program utilizes three additional FORTRAN subprograms identified as CVARQ, TVARQ and XVARQ. In conjunction, these sub-programs identify the sets of tableau vector F(1), F(2), . . . F(14), as well as the matrix elements A(1), A(2), A(3), . . . A(12), as described previously. In the specific example discussed herein, the CVARQ FORTRAN program is void since there are no branch elements defined for which the constants exhibit any variance. The TVARQ FORTRAN program generates the computer code for the functions F(1)–F(6) and the XVARQ FORTRAN program generates the computer code for the functions F(7)–F(14). Each of the program codes generated are stored and available for access during the execution phase of the network design system. Thus, for example, when it is necessary to calculate a particular matrix element such as the $\delta\psi/\delta v2$, the F(8) computer code will be accessed and the calculated value, A(5), would be stored in the appropriate matrix element storage location corresponding to row 8, column 7.

Format of Matrix Structure

In order to efficiently use computer storage and make utilization of sparse matrix techniques by elimination of unnecessary calculations, the matrix is arranged in a compacted format. Specifically, by realization that there are only 30 elements out of a 14 × 14 matrix which have non-zero values, an efficient technique is presented which condenses the storage of information eliminating trivial operations such as multiplications by and additions of 0.

Referring now to FIG. 10, there is shown five lists of numbers which contain a complete definition of the matrix of FIG. 9. It is these five lists of data that constitute the "File 1" output of the input processing program. In the first column which is identified as Row Pointer Matrix (RPM) there appears a list of numbers which point or refer to computer storage location which contain the number of the column in the matrix where the non-zero entries for that row begin. The matrix is scanned from left to right one row at a time beginning with the uppermost row, and numbers are stored in the RPM list for each of the 14 rows. The first entry "1," indicates that there is a non-zero entry in the first row and that the columns in the first row which have a non-zero entry will be found at storage location 1 or the first storage location in the Column Indices Matrix (CIM) list. In the first storage location in the CIM list the program simultaneously stores a numeric quantity which identifies the specific column in the first row where the first non-zero entry appears.

A specific type of notation is used herein for further compaction of data within the storage of the computer. Consider the first entry under CIM which is shown as 8 * 3 + 0 (actually a value of 24 would appear in storage), the multiplier 3 identifies the first entry in Row 1 at Column 3. Further, from this same number 24, the remainder term 0 identifies that the specific matrix element that appears at Row 1, Column 3 has a "variability type" of 0. The significance of this notation will be better understood after a discussion of 123-GNSO sub-program which is addressed later on in this specification. For the time being it is sufficient to appreciate that every element in the matrix has a specific variability type associated with it, +1 elements are identified as variability type 0, −1 elements are identified as variability type +1 (both +1 and −1 are broadly categorized as topological elements). Other elements such as partial derivatives or derivatives with respect to time will take on variability type identifiers of 5 and 3.

Another term of information obtained from the RPM entries is that subsequent entries on the list may be used to find the total number of elements in a particular row. For example, again referring to the first entry, it is seen that the subsequent entry is the number 3. Therefore, this means that there are two elements in the first row since the number 3 indicates that in the second row the first entry is placed in the third location of the CIM and since there are only two entries before the third location, only two entries for the first row are present. In a similar manner, all of the numerical pointers in the RPM file point to the beginning address where column identifiers begin and they also delimit the last column identifier for each row.

In an associated list A which is resident in storage during the formation of "list 1," the actual matrix element values are stored in locations 1–12 as described previously. Note that the program provides a further order of compaction by taking advantage of the fact that there are many topological elements within the matrix. The +1 and −1 elements need only be stored once and whenever they need to be accessed, a pointer identifies locations 1 and 2 in the A list where the numbers may be obtained by loading a register with the appropriate value. This technique frees 18 storage locations for the problem under consideration. This technique will now be described in detail.

In order to maintain a running list of the variability type of each element identified in the CIM, a separate list A1 is stored. This list A1 merely contains a set of numbers each being one greater than the additive element in the CIM list. The reason for the incrementation of 1 of all the variability types identified in CIM is to achieve a certain degree of programming convenience in the avoidance of using the number 0 as an identifier.

The last list shown in FIG. 10 is the A11 list which contains the storage location in the A list for each CIM entry, so that the actual value of the matrix element may be obtained upon request. For example, referring to the 16th element in the matrix or the 16th storage location in CIM, (which relates to the 8th row and 7th column element in the matrix) and by reference to the corresponding entry in the A1 and A11 lists where the numbers 6 and 5 are found, it is seen that the variability type is 5, and the actual element value, $\delta\psi/\delta v2$ is easily obtained, i.e., it resides in location A(5). Note, for example, at location 7 in list A there is found the $\delta\phi/\delta v3$ term which is obtained by reference to a user supplied program for the determination of $\phi$ over the entire range of $t$. In a similar manner every non-zero element of the Jacobian matrix shown in FIG. 9 is completely identified by value and variability type in the list shown in FIG. 10.

Note that by formatting the matrix in this manner a significant amount of computer storage is saved. After the five lists are generated by the input processing program, they are stored on a disc or other auxiliary storage device and identified as "File 1" to be used by the execution program.

As is generally known in the programming art, much of the cross linkage and branching to sub-routines is automatically taken care of by the compiler program. Thus, when user specified sub-routines are identified by name, the compiler automatically stores the address where the sub-routine begins and after calculation of a particular value a return is executed back to the main program at the point of exit.

As discussed previously, the CVARQ, TVARQ and XVARQ programs provide the computer code for determining the matrix element values listed in mathematical notation in FIGS. 9 and 10. Thus, at storage locations 3–8 in list A, there would be present computational results from the execution of the XVARQ program and locations 9–12 would contain results from the execution of TVARQ.

OPTORD

The OPTORD sub-program is a feature of the automated network design system which reduces the amount of computer time needed in the solution of the sparse matrix which represents the electrical network. OPTORD is extremely useful where it is necessary to carry out a complete solution of the matrix many many times in an iterative fashion. When this is the case, it is advantageous to allow the OPTORD program to determine the optimal pivot points of the sparse matrix thus minimizing the amount of "fill-in" which will result during the elimination process performed on the matrix (either Gaussian or Crout triangularization). The term "fill-in" as used herein relates to the additional matrix elements which are introduced by the factorization process of the Crout triangularization procedure, or the additional elements introduced in a matrix during a Gaussian elimination. For example, in FIG. 11A, the dashed F elements in the matrix represents fill-ins which occurred during the factorization procedure, after rearrangement of the matrix by OPTORD.

Figure 6:
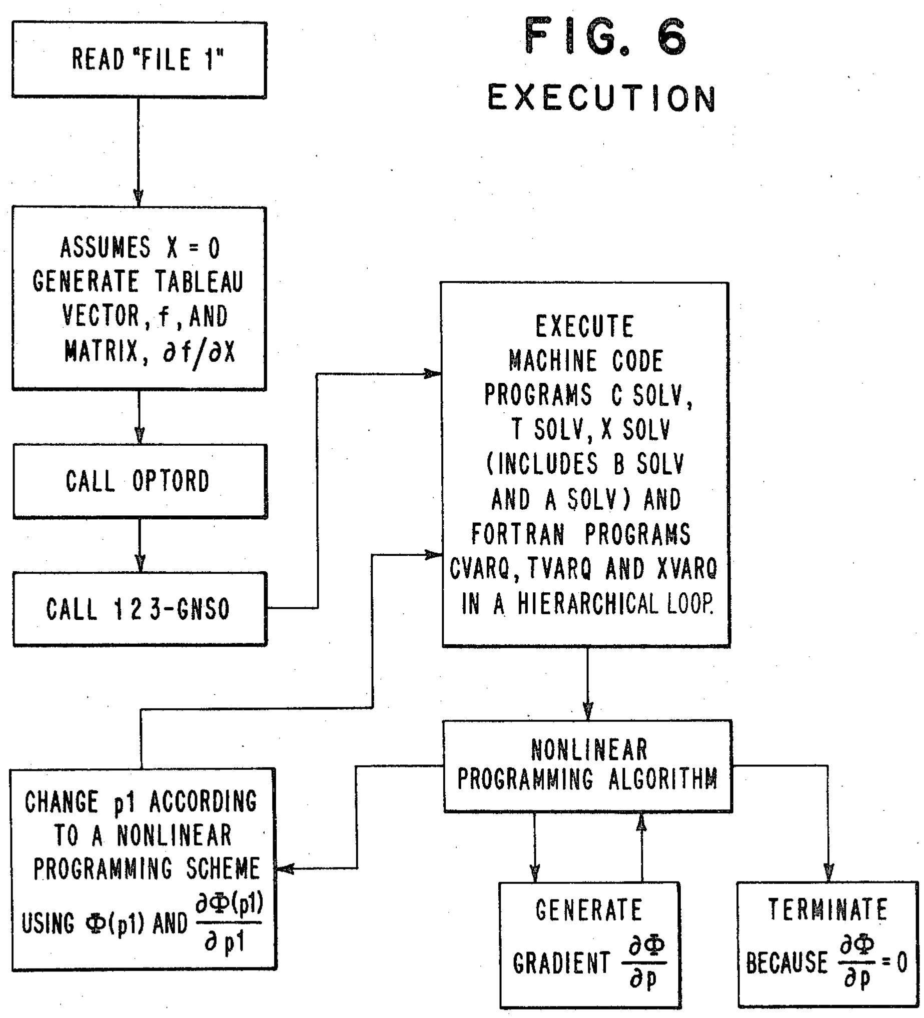
FIG. 6 is a logic flow diagram showing the execution of the network design system.

During the initialization of the execution program shown in FIG. 6, the five lists which completely identify the Jacobian matrix are read into storage. Then, an initial value of X = 0 is chosen and OPTORD generates a tableau and the VARQ programs are executed to generate the Jacobian matrix elements for the initial value of X = 0. As indicated previously, one of the purposes of the OPTORD program is to find the optimal pivot points of the sparse matrix so as to minimize the amount of fill-in which will occur during a Gaussian elimination process on the matrix. A further objective of the program is to insure that pivot points which are selected are not of such a small value that they introduce computational errors by a reason of round-off on an overflow of internal computer registers.

The program achieves its objectives by the following steps:

1. Select a pivot point N in the matrix A.

2. Determine if the element passes a numerical tolerance test and if it does not, select a different pivot point.

3. If the tolerance test is satisfied, compute a multiplication weighting function which represents the number of multiplications required of the selected pivot point in order to achieve the Gaussian elimination of the variable associated with the pivot column.

4. Repeat the process until all of the non-zero elements in the matrix are processed and have been attributed a weighting function.

5. Select the pivot point which has the lowest weighting factor.

6. With the selected element as a pivot point, perform the Gaussian elimination on the matrix updating the multiplication count weighting functions and keeping track of the number of fill-in's required as they occur.

7. Remove the pivot row and column from the updated matrix.

8. Repeat the process $n$ times until all rows and columns have been removed.

To better understand the OPTORD algorithm, reference should be made to FIG. 11 which shows the matrix of FIG. 8 rearranged so that optimum pivot points fall along the diagonal of the matrix. As is well known to those skilled in the art, a desirable characteristic of a pivot point is that it have an element value of 1 so as to minimize the number of multiplications needed to zero out the remaining elements in the column. Furthermore, if the elements in the same row are 0, the Gaussian elimination will exhibit no fill-in. For the specific example shown herein, the fill-in elements are identified by the dashed letter F, and as can be seen, there are only four fill-in elements which are present for this 14 × 14 matrix based on the selected pivot points which are found by the OPTORD program.

It should be recognized by those skilled in the art, that while use of the OPTORD program makes for more efficient operation of the inventive system, its use is not an absolute requirement. The invention may be practiced without the OPTORD ordering of pivot points if the user is willing to expend greater amount of computer time for additional multiplications and provide the sufficient storage for the fill-in which will occur during the solution of the Gaussian or Crout elimination procedure.

123–GNSO

Referring to FIG. 6, it is seen that after the optimal ordering is achieved the next sub-program to be called is 123-GNSO. This program produces three machine code programs which represent a CROUT factorization of the matrix A, including the back solution of the sparse matrix A. The 123–GNSO program may be considered as being formed by two major elements. First, the "generate solve" portion of the program carries out the CROUT algorithm on the matrix and stores, in a compacted notation, all of the elements of the upper and lower elements of a factored matrix. Then, the 123 portion of the program separates the elements which are expressed in computer program code form into separate buffers, each buffer containing like elements. That is, a first buffer containing the machine code which access only the constant elements of the CROUT factored matrix; a second buffer containing the machine code which accesses only elements which vary with respect to time, or are constant; and a third buffer which contains the machine code which accesses only elements that vary with the unknown vector X, or time or are constant. The back solve and adjoint back solve codes are separated into two additional buffers.

As is very well known in the art, the CROUT algorithm is a method to effect the triangular factorization of a matrix which results in a time saving solution for solving simultaneous linear equations. Other methods of solving linear equations are known such as Gaussian elimination or Gauss Jordan elimination but they are not all as efficient as the Crout method. It should be recognized that the selection of Crout is a matter of design choice. For a presentation of the CROUT algorithm reference should be made to CROUT, Prescott, D. "A Short Method for Evaluating Determinants and Solving Systems of Linear Equations with Real or Complex Coefficients." *AIEEE Transactions*, 1941, Volume 60, pages 1235–1241. The essence of the CROUT process, is that in the solution of a system of linear equations $Ax = b$, the matrix A may be factored according to certain rules into two triangular matrices. A lower matrix L whose elements are concentrated on or below a diagonal line running from the upper left-hand corner to the lower right-hand corner and an upper U matrix whose elements are all concentrated on or above the diagonal.

What is accomplished by this factorization, is that it is possible to solve the original equation $Ax = b$ in a factored fashion. Since $A = L \times U$ the original equation may be expressed as $(LU) \cdot x = b$. Furthermore, since matrix multiplication has an associative property, the equation may be restated as $L(Ux) = b$. If a single term $y$ is substituted for $(Ux)$, the result then becomes $Ly = b$. This triangular equation can then be easily solved for values of $y$ since the L and $b$ values are known. Once the $y$ values are obtained, then having the U values known, it becomes possible to solve the $Ux = y$ for the values of $x$ in a similar manner. The procedure for solving for $y$, then $x$, is called back solving and the same procedure, but with L replaced by U and U replaced by L, is called adjoint back solving.

Figures 11A, 11B:
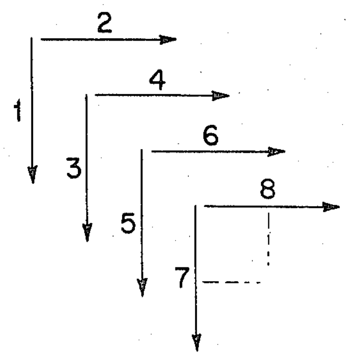
FIG. 11(a) represents the lower and upper Crout factorization matrices combined of the permuted matrix in a compacted format.
FIG. 11(B) indicates the sequence of notation for computer storage of the compacted matrix shown in FIG. 11(A).

Returning to the example described herein, the optimized matrix shown in FIG. 11A is factored into a lower and upper submatrix in accordance with the CROUT algorithm. Furthermore, since the properties of the factored matrices insures that the elements on either side of the diagonal are 0 the GNSO sub-program compacts all of the lower and upper matrix elements into a single C matrix. Each of the C matrix elements L and U are calculated in accordance with the following functions:

$$l_{im} = a_{im} - \sum_{\mu=1}^{m-1} l_{i\mu} u_{\mu m}$$

for $i=m, m+1, \ldots, N$. Then successively compute $$u_{mj} = \left(a_{mj} - \sum_{\mu=1}^{m-1} l_{m\mu} u_{\mu j}\right) / l_{mm}$$

for $j=m+1, m+2, \ldots, N$. Then, in the backsubstitution compute $$y_i = \left(b_i - \sum_{\mu=1}^{i-1} l_{i\mu} y_\mu\right) / l_{ii}$$

successively for $i=1, 2, \ldots,$ N, and $$x_i = y_i - \sum_{\mu=i+1}^{N} u_{i\mu} x_\mu$$

for $i = N, N-1, \ldots, 1$.

The resulting pattern of non-zero elements in the C matrix are then stored in the computer by first going down the first column, then across the first row, then down the remainder of the second column, then across the remainder of the second row, etc., as shown in FIG. 11B. For a more detailed discussion of the computer program code for carrying out the generate solve portion of the GNSO program and details for calculating each of the lower and upper matrix elements, reference should be made to the program disclosed in, F. G. Gustavson, W. Liniger, and R. Willoughby, "Symbolic Generation of an Optimal Crout Algorithm for Sparse Systems of Linear Equations," *Journal of the Association for Computing Machinery*, Vol. 17, No. 1, January 1970, pages 87–109.

The computed values of the elements of the C matrix carried out in accordance with the L and U equation are listed in FIG. 12. Every element C1 through C34 is expressed in terms of the original A matrix. Thus, element C1 of the C matrix is equal to or can be determined from element a12 in the A matrix, which in fact appears as a 1 entry at the 6th row and 6th column of the A matrix. Taking another example, element C5 is equal to a *a*30 which is equal to *–d/dt* in the 14th row and 14th column of the A matrix and which is further stored in the A storage location 12 in list A as shown in FIG. 10.

After all of the C element expression are computed the 123 portion of the program examines each element equation (by reference to list A1, FIG. 10) according to variability type. That is, each load, add, multiply operation needed to compute the element expressions is first examined to see if any operand is X-type. If X type, then the instructions required to execute that operator are put in the X type buffer. Second, if any remaining operators have an operand of T-type then the corresponding instructions are put in the T-type buffer and finally all remaining instruction are put in the C-type buffer. The full list of 17 matrix elements that completely define the C matrix are shown in FIG. 13. Note that each of the elements are expressed in terms of the A matrix notation.

After the C, T and X machine code Solve programs are stored in their respective buffers, the execution program whose logic flow is shown in FIG. 6 loads the buffers into storage so that they can be executed upon demand from the main program. In accordance with the objective of the system, an optimum value of *p*1 is to be obtained by means of a nonlinear programming algorithm. That is, a first choice is made for the variable *p*1 for which a time sweep is carried out from TI to TF as specified by the user. Then the nonlinear programming algorithm takes over. This algorithm can call for a gradient evaluation and from this information will either increment the value of p1 or decide that the optimum has been reached. If *p*1 is incremented then a further time sweep over the entire time sequence TI to TF is repeated. This process is continued until the optimum value of *p*1 is found. An example of a nonlinear programming algorithm which might be used is given in "A Rapidly Convergent Descent Method for Minimization," *Computer Journal*, Vol. 6, 1965, p. 163–168, by R. Fletcher and M. J. D. Powell.

EXECUTION

Referring to FIG. 6, there is shown a flow diagram representing the sequence of computer operations which are carried out in the execution of the automatic network optimization program. The first step in the process is to read in the numerical data "file 1" which consists of all of the non-zero entries in the tableau matrix as arranged in FIG. 10. Zero elements are not stored since the inventive process makes use of the fact that multiplications and additions with zero quantities are trivial computations and thus may be eliminated.

The execution portion of the program organizes all of the non-zero entries in the tableau matrix in a format ready for the processing in the program. This is doe by assuming that X = 0, or equating all of the unknown vectors to equal 0. Then, after the tableau matrix which represents the Jacobian of the function F(X) is evaluated by executing the VARQ programs, the execution program prepares for an iterative solution of the matrix by first calling the OPTORD program to determine the optimal ordering of the pivot points in a manner as discussed previously in this specification. Then, the 123–GNSO program is called and executed to generate three buffers of Solve program codes for evaluating every element in a factorized Crout compacted matrix, such as indicated in FIG. 13. After having executed 123–GNSO, the system is prepared to find the optimum in accordance with the procedure shown in FIG. 7.

Figure 7:
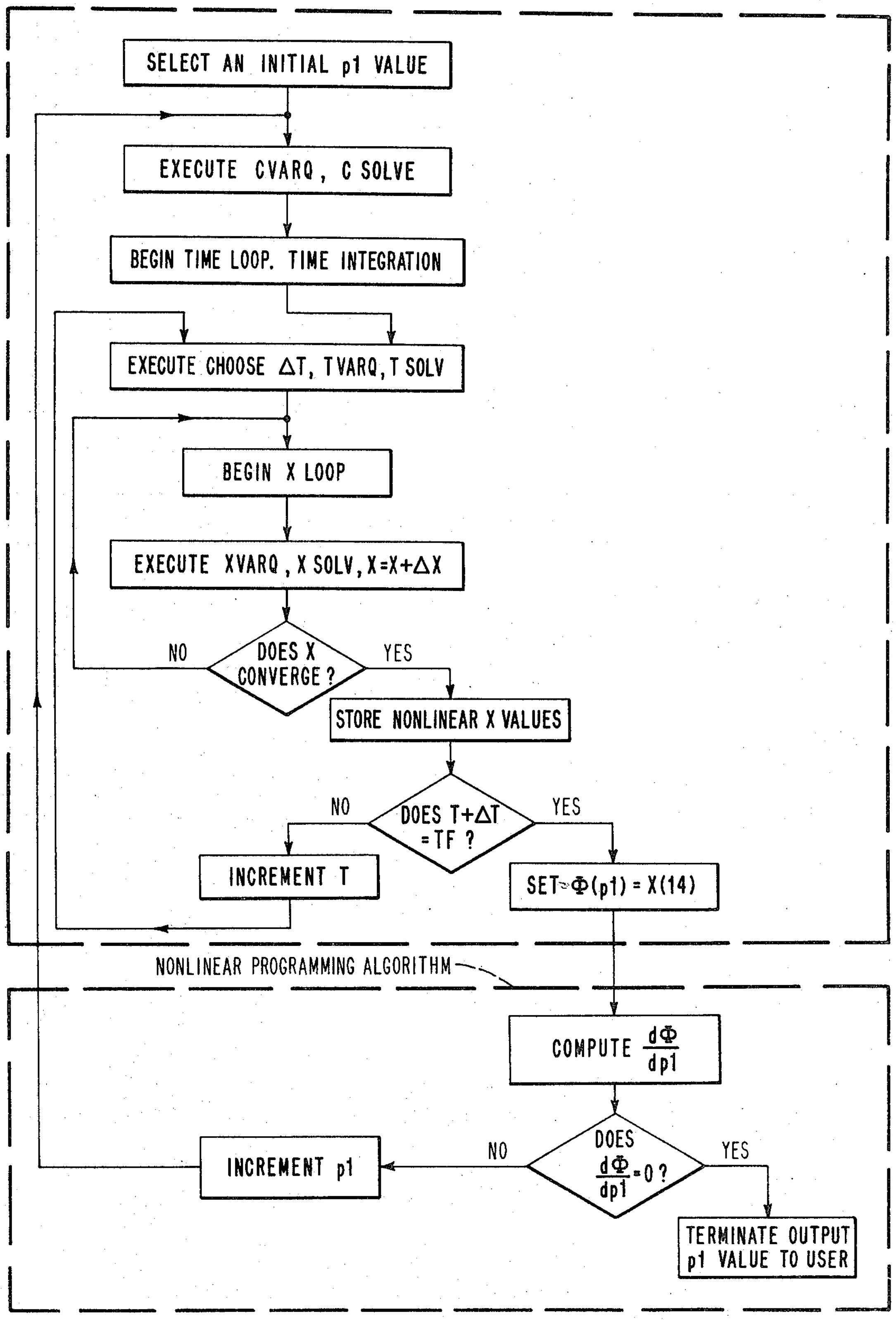
FIG. 7 is a logic flow diagram showing the hierarchical loop structure for executing the variability type Solve programs during a Newtonian iteration.

Referring now to FIG. 7, there is shown a hierarchical iterative loop structure for finding the optimum design parameter *p*1 of the tableau error vector. The term hierarchical loop as used herein refers to a complete iterative sub-process that is completed within the framework of a higher order loop. Thus, by reference to FIG. 7 it is seen that variable X loop is completely executed within the T loop which is in turn executed within the C loop (or *p* loop). Prior to entering the iterative process, an initial selection of a design parameter *p*1 is chosen. It should be obvious to those skilled in the art that while initial variable quantities in the example as selected by the user, by using known programming techniques, the system could automatically determine suitable initial values. Then, the CVARQ and the C solve program codes are executed to calculate all of the constant values in the tableau matrix and store the results in the appropriate storage areas of the array. These values are then used during subsequent computations for different time values and different values of X since the C elements do not change with respect to *t* or X.

Following the computation of the C matrix elements, a time TI = 0 as indicated by the user is used to calculate all of the T variables in the sparse matrix by means of a T-VARQ and T-SOLVE computer program. As described earlier, the T-SOLVE program computes matrix elements of the compacted C matrix and in this computation makes reference to the A matrix elements which are in turn computed by the T-VARQ programs. After the time dependent matrix elements are stored in their respective array storage locations, the X Newton iterative loop is begun. Similar to the T loop, the X-VARQ and X-SOLVE computer code sub-programs which were generated by the 123–GNSO are executed to compute all of the remaining matrix elements. Finally, B-SOLVE is executed and a Newton iteration is performed to find the roots of the tableau vector F(X), which are determined when the tableau error vector has converged. That is, by inserting the values of X variables into the tableau error vector F(X) and checking if the vector equals zero convergence is tested for. If the function has not converged, the X loop is repeated with a value $X + \Delta X$. This iteration is continued until a convergence is reached. In order to take into account certain functions which do not have convergent roots, a simple test can be made to check that the function F(X) is approaching convergence and if it is found to be diverging, either the program can be terminated or a new value of $p1$ is chosen and the process is re-executed. After the X loop is completed, the time is incremented and the X-loop repeated again. This is repeated until $t$ = TF. At this point $\Phi(p1)$ is known since it is simply X(13), i.e., one of the tableau unknowns. By computing $\delta\Phi/\delta p1$ and checking whether this quantity is equal to zero, a test for optimum is made. Note that if $\Phi$ were a function of more than one design parameter p, the test would be conducted by $\delta\Phi/\delta p = 0$. If an optimum is reached, the program terminates and the optimum value of $p1$ is outputed to the user. If the optimum value of $p1$ has not yet been reached the design parameter is incremented and the process is re-executed. This incrementing of $p1$ and deciding when to evaluate $\delta\Phi/\delta p$ is part of the nonlinear programming algorithm.

The X iterative loop is a Newton iteration, (or modified Newton iteration) which is a very well known process as described in, E. Isaacson and H. Keller, Analysis of Numerical Methods, New York, Wiley & Sons, 1967, Chapters 3 and 4. In essence, what this process does, is to find those values of X for which the function equals zero by taking the derivative of the function, known as the Jacobian and solving for the variable values that cause the associated linear equations to be satisfied. After having found these roots, they are reinserted into the original equation and a new point is found about which to take the derivative. This process is repeated until both the Jacobian and the functions are both equal to zero at the chosen variable point.

As can be appreciated by reference to the example considered herein, the iterative process described requires that the matrix which describes the Jacobian of the error vector be solved a great number of times. Thus, by the elimination of trivial computational sets and dividing the solve programs into groups specifically related to the hierarchical iterative loops, a large reduction of computer processing time is realized.

Computation of the Gradient, $\delta\Phi/\delta p = d\Phi/dp1$

Part of the inventive process concerns how the tableau matrix can be used to determine the gradient of $\Phi(p)$. As was noted previously in describing how the tableau was augmented, certain elements called parameters were added to the original network as well as the objector. The purpose of adding the objector, as has been shown, was so that the value of $\Phi$ could be obtained by referring to X(13) at the final time TF. Thus, the essential purpose of adding the parameters is so that the gradients can be obtained by referring to certain values of the unknown vector.

Referring to FIG. 9, it is seen that new variables $dv1$, $dv2, \ldots,$ dqp are listed along the right-hand side. These are called the adjoint variables and the adjoint equations are those obtained by having the columns of the tableau matrix form the equations to be solved. Thus, the first adjoint equation generated by column 1 is $di1 + di2 = 0$, while Equation 14 is $dp1 - (d/dt)(dqp1) = 0$. Only one modification of the tableau matrix is required and that is, that the sign of the $d/dt$ terms in the original unaugmented network are reversed. Thus, Equations 12 and 13 are $-dv2 + (d/dt)\,dq2 = 0$ and $-dv3 + (d/dt)\,dq3 = 0$, respectively. The system of differential and algebraic equations represented by the adjoint tableau are then solved in a similar manner as were the equations that represented the network. In fact the same programs which perform the Crout factorization C-SOLVE, T-SOLVE, X-SOLVE can be used. Only B-SOLVE has to be replaced by adjoint B-SOLVE. There are, however, two further differences. First, since the adjoint equations are linear, no Newton iteration is required, i.e., there is only one execution of the X-loop. Second, instead of having the time sweep from TI to TF, the time sweep is backwards, i.e., from TF to TI. The initial starting values for the adjoint variables are zero except for $dq\Phi$ which is set to one.

When the time sweep is completed the value of dqp at time $t$ = TI is noted. This value comprises part of the gradient value $d\Phi/dp1$. To compute the other part, one more linear equation is solved at time $t$ = TI. This linear equation is represented again by the tableau matrix with only minor modifications. These are: (1) the $-d/dt$ terms associated $dq2$ and $dq3$ are set equal to 0; (2) the remaining $-d/dt$ terms are set equal to −1 and; (3) the Equations 11 and 12 (i.e., in general those associated with the $d/dt$ of the original unaugmented network) become $$-dv2 + 0 \cdot dq2 = dq2\,(\mathrm{TI})$$

$$-dv3 + 0 \cdot dq3 = dq3\,(\mathrm{TI})$$

These modified adjoint equations are solved and the value of dqp is added to dqp (TI) to give the gradient, i.e., $$d\Phi/dp1 = dqp + dqp\,(\mathrm{TI})$$

It should be noted that in order to determine the element values of the tableau matrix during the backward time sweep, the values of X, obtained during the forward time sweep, which cause the tableau matrix to vary (and which were stored on auxiliary storage) are read in. The values of these X at the current time is then determined by interpolation and XVARQ is executed to compute the numerical values of the elements of the tableau matrix.

Thus the gradients are calculated by using the same tableau matrix, so that no additional OPTORD, 123–GNSO procedures need be executed. The same C-SOLVE, T-SOLVE and X-SOLVE programs can be used to factor the tableau matrix into triangular factors. Only the B-SOLVE program has to be replaced by the adjoint B-SOLVE program. By adding the parameters to the network, it is possible to simply read off the gradients as part of the unknown vector without doing any further calculation. In addition, since the structure for the adjoint equations and the iteration loops are very similar to the forward time sweep, much of the same program controlling the forward time sweep can be used to control the backward time sweep thus allowing for a smaller program.

Extension and Obvious Modifications of the Process

The inventive process disclosed herein was described in terms of a simplified example which reduced to a 14 × 14 matrix. Those skilled in the art will clearly recognize that such an example is chosen merely for illustrative purposes and that much larger problems are within the capability of the disclosed process.

It should also be recognized by those skilled in the art, that while a specific example utilized herein optimizes a network problem, the sparse matrix techniques are applicable to other systems of non-linear equations and are not restricted to electrical problems. For example, it is possible to use both the OPTORD and 123-GNSO sub-program in any sparse matrix problem such as can be found in economic optimization problems, transportation problems, electric power distribution and other dynamic systems which can be expressed in terms of a set of algebraic and differential equations and which exhibit the property that many of the variables are not interrelated.

It should also be recognized that the program described herein can be restricted to one time sweep, one forward time sweep and one backward time sweep, or merely to an equilibrium calculation at $t = \mathrm{TI}$. Further, it should be recognized that the function to be minimized does not have to be in the exact form $$\int_{TI}^{TF} \phi dt$$

but can be simply $$\phi[x(TI)] \text{ or } \phi_0[x(TI)]+\int_{TI}^{TF} \phi_1[x(t)]dt$$

Such minor variations can easily be accomplished by persons of ordinary skill in the programming art.

It should also be recognized that there are a great number of $x$ variables for a given problem, many of which the user has no interest in and are not needed for evaluating the tableau matrix and tableau vector. It is therefore possible to eliminate these variables first, thus placing these variables at the top of the X vector. Then in the backsolving process, it is only necessary to proceed to the point where all relevant variables have been obtained.

It should also be recognized by those skilled in the art that the time sweep is controlled by some method for numerical integration of differential equations and it is not particularly relevant to the inventive process which method is used. The particular method employed is described in "The Automatic Integration of Stiff O.D.E's," *IFIPS Congress*, August 5–10, 1958, Edinburgh, Scotland, pp. A81–A85 by C. W. Gear.

It should further be recognized that while the input processor program disclosed herein is restricted to operating on electrical network definitives, the system has a broader application to any dynamic system that is described by a set of algebraic and differential equations. It is clearly within the ordinary skill of the art to modify the automatic programmed process to generate a virtual circuit element for each equation. Thus, the general dynamic system would be expressed in a compatible notation for the disclosed input processor.

What is claimed is:

1. An automated process for analysis and design of a dynamic system expressed as a set of algebraic and differential equations which include a design objective function of said system, whereby said system of equations is represented by a set of data that is identifiable to an automatic data processor, said process comprising the following steps each of which are executed by an automatic data processor:

reading said data into said data processor store and automatically generating a tableau vector;

generating a sparse tableau matrix from said tableau vector and storing a representation of said matrix;

compiling said data, tableau vector and tableau matrix into a plurality of computer instruction representations for deriving the state of the system;

arranging said plurality of computer instruction representations in a hierarchical ordered sequence;

selecting an initial value of a design parameter and integrating said tableau vector with respect to a swept variable, $t$, from an initial value TI to final value TF;

performing an iteration for each value of t to find the convergent roots of said tableau vector;

storing representations of said convergent roots;

obtaining said design objective function from said tableau matrix and testing to see if said selected design parameter value optimizes said design function;

repeating said integration iteration with an incremented value of said design parameter until an optimum is reached.

2. The process as defined in claim 1 further comprising the steps of:

compiling additional data and representations of machine code for deriving the sensitivity of the state of said system and the sensitivity of said design objective function with respect to variations in said design parameters;

integrating the adjacent equations given by the transpose of said tableau matrix, with respect to said swept variable, $t$, from said value TF to said value TI;

said integrating step resulting in the gradient of said design objective function and parameters;

testing said gradient for a zero value, repeating said process with a new design parameter if said gradient is not zero.

3. The process as defined in claim 1 wherein said step of compiling computer code representations comprises:

factoring said tableau matrix into a lower and upper triangular factored element matrix;

combining said upper and lower matrices into a compacted matrix;

storing only the non-zero elements of said matrix in a computer data store;

compiling a set of computer code statements for calculating each of said non-zero compacted matrix elements;

executing said computer code statements in a hierarchical order;

whereby only values which vary with respect to a given calculation will be computed and all values which are not variant during said calculation are re-used as previously calculated.

4. The process as defined in claim 3 wherein said step of grouping computer code representations comprises the steps of:

examining said computer code statements and categorizing them in accordance with their variability type;

storing all code statements of a parameter variability type into a first buffer;

storing all computer code statements of a time variability type into a second buffer;

storing said computer code statements of a state of the system variability type into a third buffer.

5. The process as defined in claim 4 further comprising the steps of:

executing said compiled program code in said first, second and third buffers sequentially as they are needed in the iterative loops;

whereby said parameter variability type code in said first buffer is executed only when there is an increment of said design parameter and said computer code statements in said second buffer are executed only when there is an increment of swept variable t, and said computer code statements in said third buffer are executed once for every increment in the state of the system.

6. The process as defined in claim 5 wherein said step of combining said lower and upper matrices into a compacted matrix comprises the steps of:

combining all corresponding elements of said lower and upper matrices so as to form a single matrix;

storing in computer store certain non-zero matrix element values in a compact sequence until every matrix element has been stored.

7. The process as defined in claim 6 further comprising the steps of:

arranging certain non-zero element values of said matrix in sequential computer storage locations;

generating a set of pointers which identify where in storage said matrix element values may be found;

generating a list of column locations and variability type values for each non-zero element in said matrix.

8. An automatic program process for analysis of an electrical network and determining and optimizing a design objective function for said network wherein said function may have one or more design parameters which can be controlled by the user of the process said network being identifiable to an automatic data processor by representation corresponding to the network brand elements and interconnection nodes, said process comprising the following steps each of which are executed by an automatic data processor:

generating a plurality of virtual circuit elements to augment said network to include said design objective function and parameters as part of said network;

generating a set of data that defines said augmented network and all user control input;

reading said data into said data processor store and automatically generating a tableau vector;

generating a sparse tableau matrix from said tableau vector and storing a representation of said matrix;

compiling said data, tableau vector, and tableau matrix into a plurality of computer instruction code statements which when executed iteratively compute the state of the network;

arranging said plurality of instruction code statements in a hierarchical ordered sequence;

selecting an initial value of said design parameters and integrating said tableau vector with respect to a swept variable, *t*, from an initial value TI to a final value TF:

performing an iteration for each value of *t* to find the convergent roots of said tableau vector;

storing representations of said convergent roots;

obtaining said design objective function from said tableau matrix and testing to see if said selected design parameter value optimizes said design function;

repeating said integration iteration with an incremented value of said design parameter until an optimum is found.

9. The process as defined in claim 8 further comprising the steps of:

compiling additional data and machine code statements which when executed iteratively with said compiled computer instruction code, compute the sensitivity of the state of said network and the sensitivity of said design objective function with respect to variations in said design parameters;

executing all compiled computer code statements;

integrating the adjoint equations given by the transpose of said tableau matrix, with respect to said swept variable, *t*, from said value TF to said value TI;

said integrating step resulting in the gradient of said design function appearing as the state of said virtual circuit elements;

testing said gradient for a zero value;

repeating said process with a new design parameter if said gradient is not zero.

10. The process as defined in claim 8 wherein said step of compiling computer code statements comprises:

factoring said tableau matrix into a lower and upper triangular factored element matrix;

combining said upper and lower matrices into a compacted matrix;

storing only the non-zero elements of said matrix in a computer data store;

compiling a set of computer code statements for calculating each of said non-zero compacted matrix elements;

executing said computer code statements in a hierarchical order;

whereby only element values which vary with respect to a given calculation will be computed and all element values which are not variant during said calculation are re-used as previously calculated.

11. The process as defined in claim 10 wherein said step of grouping computer code statements comprises the steps of:

examining said computer code statements and categorizing them in accordance with their variability type;

storing all code statements of a constant variability type into a first buffer;

storing all computer code statements of a time variability type into a second buffer;

storing said computer code statements of a state of the network variability type into a third buffer.

12. The process as defined in claim 11 further comprising the steps of:

executing said compiled program code in said first, second and third buffers sequentially as they are needed in the iterative loop;

whereby said constant variability type code in said first buffer is executed only when there is an increment of said design parameter and said computer code statements in said second buffer are executed only when there is an increment of swept variable $t$, and said computer code statements in said third buffer are executed once for every increment in the state of the network.

13. The process as defined in claim 12 wherein said step of combining said lower and upper matrices into a compacted matrix comprises the steps of:

combining all corresponding elements of said lower and upper matrices so as to form a single matrix;

storing in computer store certain non-zero matrix element values in a compact sequence until every matrix element has been stored.

14. The process as defined in claim 13 further comprising the steps of:

arranging certain non-zero element values of said matrix in sequential computer storage locations;

generating a set of pointers which identify where in storage said matrix element values may be found;

generating a list of column location and variability type values for each non-zero element in said matrix.

15. An automatic program process for repetitively solving a system of linear algebraic equations expressed as $Ax = b$, where A consists of a matrix whose elements may vary at different rates, represented in a computer by a data structure, said process comprising the following steps each of which are executed by an automatic data processor:

determining the optimal pivot points of said matrix subject to weighted considerations;

factoring said matrix into a lower and upper factored element matrix in accordance with said optimal pivot point ordering, combining said upper and lower matrices into a compacted matrix;

compiling said data into a plurality of computer instruction code statements which when executed compute the element values in said factored matrix;

iteratively executing said code statements for carrying out the factorization and back substitution for determining the state, $x$, of said system;

arranging said compiled computer code statements in a hierarchical order dependent on the variation which the particular matrix elements exhibits with respect to variations in said matrix elements.

16. The process as defined in claim 15 wherein said step of combining said lower and upper matrices into a compacted matrix comprises the steps of:

combining all corresponding elements of said lower and upper matrices so as to form a single matrix;

storing in a computer store certain non-zero matrix element values in a compact sequence until every matrix element has been stored.

17. The process as defined in claim 16 wherein said step of compiling computer code statements comprises:

factoring said matrix into a lower and upper triangular factored element matrix;

combining said upper and lower matrices into a compacted matrix:

storing only the non-zero, elements of said matrix in a computer data store;

compiling a set of computer code statements for calculating each of said non-zero compacted matrix elements;

executing said computer code statements in a hierarchical order;

whereby only element values which vary with respect to a given calculation will be computed and all element values which are not variant during said calculation are re-used as previously calculated.

18. The process as defined in claim 17 further comprising the steps of:

arranging certain non-zero element values of said matrix in sequential computer storage locations;

generating a set of pointers which identify where in storage said matrix element values may be found;

generating a list of column location and variability type values for each non-zero element in said matrix.

* * * * *